CONTENT ADDRESSABLE MEMORY APPARATUS

Filed Dec. 30, 1963

INVENTORS
RICHARD H. FULLER
ROBERT N. MELLOTT
BY Arthur Frailich
ATTORNEY

United States Patent Office 3,290,659

Patented Dec. 6, 1966

3,290,659

CONTENT ADDRESSABLE MEMORY APPARATUS

Richard H. Fuller and Robert N. Mellott, Los Angeles, Calif., assignors, by mesne assignments, to The Bunker-Ramo Corporation, Stamford, Conn., a corporation of Delaware Filed Dec. 30, 1963, Ser. No. 334,317
8 Claims. (Cl. 340—172.5)

This invention relates generally to data processing apparatus and more particularly to content addressable memory apparatus including means for facilitating the use of such apparatus with free text or unformatted data.

Various content addressable memory implementations are shown in the prior art. For example, U.S. Patent No. 3,031,650 discloses some basic content addressable memory implementations and discusses the characteristics which distinguish such memories from conventionl digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of N locations in memory, storing information (data words) identical to a search data word, information identifying those locations can be derived in one memory access period instead of the N such periods required by conventional digital memories. More particularly, whereas it is necessary in a conventional digital memory to sequentially access the contents of each location (a data word) and compare each such data word for identity with a search data word, comparison of the search data word with all the stored data words can be simultaneously effected in a content addressable memory.

No prior art references are known which specifically discuss the application of content addressable memories to the processing of free text or relatively unformatted data. Rather, previous discussions of content addressable memories have been directed to the processing of formatted data; i.e. data in which each similar piece of information is contained in the same fixed number of digits similarly positioned in a data word. In the use of content addressable memories for such processing, a formatted search data word is simultaneously compared with all the formatted data words stored in the memory, each such data word being stored in a different memory location. In accordance with the prior art, various types of comparisons can be performed, such as equality, magnitude comparison, etc. It is often desirable to process free text or relatively unformatted data, i.e. data in which similar pieces of information can be contained in a significantly different number of digits and wherein such pieces of information are not necessarily contained in corresponding portions of data words and thus not necessarily stored in corresponding portions of memory locations. For example, consider a data list of persons' names. In one form of formatted data, each data word can contain the full name of one person and conversely each person's name can be contained in a different data word. In such a case, a data word length must be chosen which is sufficiently long to contain all the characters in the longest name on the list. This type of formatting is of course uneconomical inasmuch as most data words will therefore contain several meaningless digits. In order to avoid such uneconomical operation, the data, i.e. the list of names need not be arranged in such a specific format but instead a word data length can be arbitrarily chosen, e.g. an 8 character or 48 binary digit word length, and each name or item can be represented by a data word block containing the requisite number of data words. Thus, a ten character name would require a block containing two data words, a twenty character name would require a block containing three data words, etc. Arranged in this manner, only one data word in each block need contain any meaningless digits. Each data word of course can be stored in a different memory location.

It is an object of the present invention to provide a content addressable memory system particularly adapted to process data of the type in which data items occupy one or more memory locations.

In accordance with the invention, in sequence, each data word in a multiple word search item can be simultaneously compared with all of the data words stored in memory. Subsequent to the first comparison, only those binary sensing devices associated with memory locations storing data words matching the first search item data word will define a match state and binary sensing devices associated with all other memory locations will define a mismatch state. Prior to completing a second comparison with respect to the second search item data word, the match states of said binary sensing devices are shifted to immediately succeeding binary sensing devices. Subsequent to the second comparison, only those binary sensing devices which both define a match state and are associated with a memory location storing a data word matching the second search item data word, will define a match state.

In a preferred embodiment of the invention, a content addressable memory matrix having N rows of elements and consequently N locations is provided, each row containing Q memory elements. A different binary sensing device is associated with each matrix row. In response to each comparison, a mismatch signal is applied to each binary sensing device associated with a location storing a data word not matching, within some defined criteria, the search item data word entered into the memory search register. Subsequent to each comparison, the state of each binary sensing device to which a mismatch signal had not been applied and which consequently defines a match state is shifted to a subsequent binary sensing device. The subsequently performed comparison will again cause mismatch signals to be applied to those binary sensing devices associated with locations storing words not matching the subsequent search item data word. Thus, after performing a number of comparison cycles equal to the number of data words in the search item, a binary sensing device defining a match state indicates that the item containing the data word stored in the location associated with that binary sensing device, matches the search item.

A significant feature of the invention comprises the inclusion of information in each data word which serves to identify the position of the data word in the item of which it forms a part.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
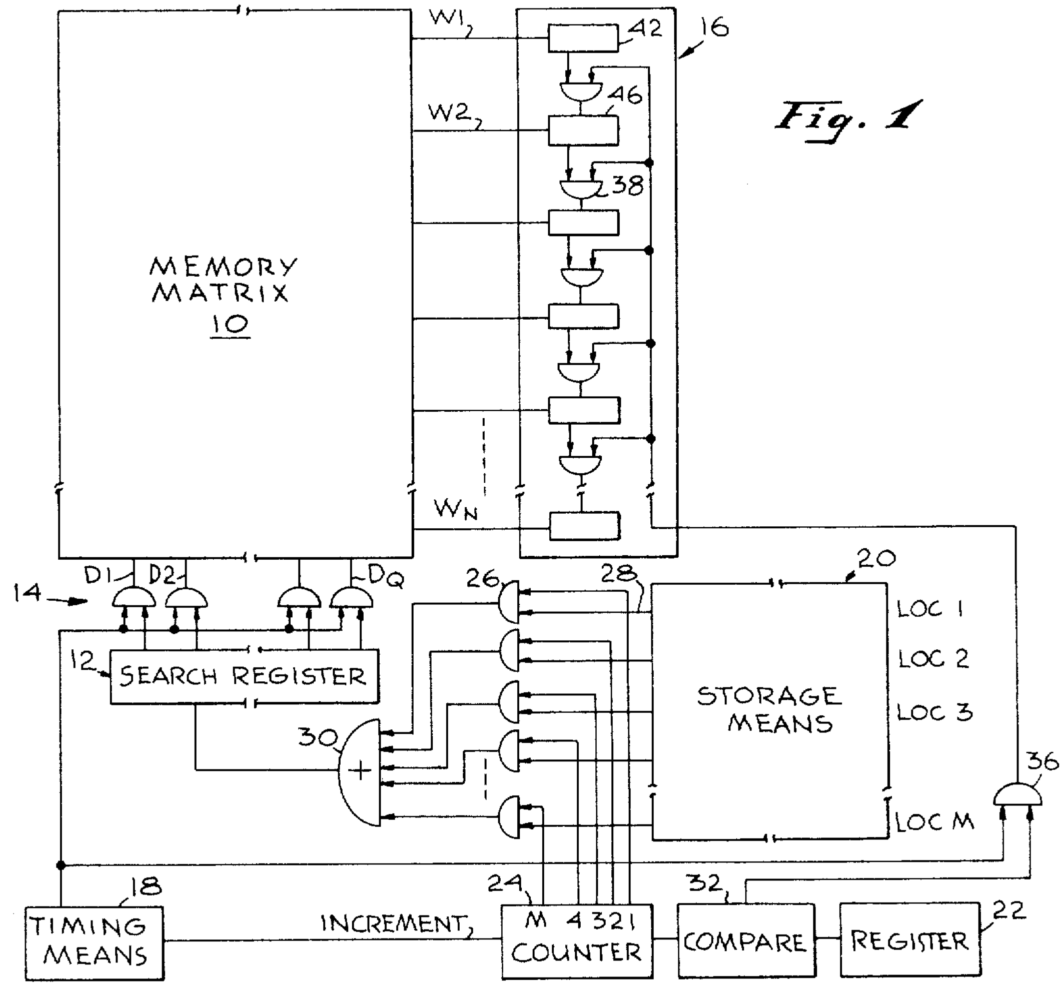
FIGURE 1 is a block diagram of a preferred embodiment of the invention.

Attention is now called to FIG. 1 which illustrates in block form a content addressable memory apparatus including a memory matrix 10, a search register 12 coupled to the matrix by logic gates 14, and a selection device 16.

The content addressable memory of FIG. 1 is illustrated in block form inasmuch as the teachings of the invention herein are equally applicable to any one of several known implementations. One such implementation is illustrated in the above-cited U.S. Patent No. 3,031,650 which discloses apparatus for simultaneously comparing a data word stored in a search register 12 with each of a plurality of data words stored in a memory matrix 10. The data word length can be arbitrarily chosen and will be considered as consisting of Q bits. Likewise, the capacity of the memory matrix is virtually unlimited and will be assumed to include N locations, each location being capable of storing a single data word. Thus, the matrix can be considered as being comprised of N rows and Q columns extending orthogonally with respect to each other. It should of course be appreciated that the actual physical relationship of the elements is unimportant and that the terms rows and columns merely refer to different groups of elements. Digit lines, D1, D2, . . . $D_Q$ are each respectively associated with all of the memory elements in a different matrix column. Similarly, word lines W1, W2, . . . $W_N$ are each associated with all of the memory elements in a different matrix row. In response to a signal provided by timing means 18, the logic gates 14 are enabled to cause a signal to be applied to each digit line, each such signal being representative of a different bit in the data word stored in the search register 12. In response to the signals provided on the digit lines, mismatch signals can be developed on the word lines whenever the state of a bit in a stored data word mismatches the corresponding bit in the data word contained in the search register 12. Thus for example, assume that the second digit in the register 12 is a binary "0" and the second digit in the data word stored in location 1 in the memory matrix 10 is a binary "1." Consequently, a mismatch signal will be applied to word line W1.

The above-cited patent illustrates apparatus for not only simultaneously comparing the data word held in the search register 12 with all of the data words stored in the memory matrix 10, but in addition causes all of the bits of different numerical significance to be simultaneously processed. In U.S. patent application Serial No. 269,009, filed on March 29, 1963, by Ralph J. Koerner and Alfred D. Scarbrough, entitled "Content Addressable Memory," and assigned to the same assignee as the present application, a content addressable memory system is disclosed in which bits are processed in order of numerical significance rather than simultaneously, although the search data word is still simultaneously compared with all the stored data words. Thus, although equality searches cannot be completed quite so rapidly as when the bits are all considered simultaneously, other types of searches, e.g. magnitude comparison such as "equal to or greater than" and "equal to or less than," can be performed. The cited patent application is similar to the cited patent to the extent that a mismatch signal is developed on each word line whenever the data word stored in the location associated therewith does not match, according to some defined criteria, the data word contained in the register 12.

In addition to the content addressable memory implementations disclosed in the above-cited U.S. patent and U.S. patent application, many other content addressable memory implementations are known in which mismatch signals are developed on word lines to indicate that a stored data word does not match a sought search data word.

Selection device 16 can, for example, be of the type disclosed in U.S. patent application Serial No. 296,001, filed on July 18, 1963, by Robert N. Mellott, entitled "Selection Device," and assigned to the same assignee as the present application. Therein a selection device including N binary stages is disclosed which can be coupled to the word lines W1, W2, . . . $W_N$. The selection device stages are each responsive to mismatch signals appearing on a different word line for switching from a match to a mismatch state. Upon the completion of a search, the states of the binary stages of the selection device can be examined to determine which of the stored data words matches the search data word.

As indicated in the introduction to the present specification, it is often desirable to process free text or relatively unformatted data. For example, consider a list of persons' names in which certain names are very short and consequently can be fully represented by a single data word and other names are very long and require several data words to fully represent them. When processing this type of information, it is important to be able to locate items, perhaps comprised of several data words, stored in memory which match a search item, rather than merely those data words in memory which match data words comprising portions of the search item. The apparatus of FIG. 1 is a preferred embodiment of apparatus particularly adapted to process items which can consist of an ordered series of one or more data words.

A storage means 20 is provided for storing the data words of a search item. Each data word of the search item is entered into a different location in the storage means 20 (by means not shown). Thus, the initial data word in the search item will be entered into location 1, the second data word in the search item will be entered into location 2, and the *n*th data word in the search item will be entered into location M. The word length of the storage means 20 is identical to the word length of the memory matrix 10. In addition to entering a search item into the storage means 20, a number is simultaneously entered into register 22 which number indicates the number of data words in the search item.

A counter 24 is provided which is incremented in response to each signal provided by the timing means 18. The timing means 18 provides a signal to the counter 24 once for each search cycle, that is each time all of the bits of the data word in the search register 12 are compared with respect to the corresponding bits in the matrix 10. The counter 24 is provided with M output terminals, each of which is uniquely energized in response to each possible state of the counter 24. Each of the counter output terminals is connected to the input of a different AND gate 26. A second input to each of the AND gates 26 comprises a different readout line 28, each readout line being associated with a different location in the storage means 20. The outputs of all of the AND gates 26 are connected to the inputs of an OR gate 30 whose output in turn is connected to the input of the search register 12.

Thus, for each count defined by the counter 24, a different data word is transferred from the storage means 20 into the search register 12 and then compared with all of the data words stored in the memory matrix 10. After each comparison, the counter is incremented to cause a subsequent search item data word to be transferred from the storage means 20 to the search register 12. The search item data words can be transferred from the storage means 20 to the search register 12 either serially or in parallel. Although only one AND gate 26 is illustrated as being associated with each of the locations of the storage means 20, it should be apparent that if the Q bits in each data word are to be transferred in parallel, Q AND gates, each being connected to the input of a different one of the Q stages of the search register 12, should be provided for each of the storage means locations.

It will be recalled that when the search item is entered into the storage means 20, a number is entered into the register 22 which represents the number of data words in the search item. A compare means 32 continually compares the number stored in the register 22 with the count in the counter 24. For so long as the count in counter 24 is different from the number in register 22, an enabling signal is provided on output terminal 34 connected to the input of AND gate 36. A second input to AND gate 36 is derived from the output terminal of timing means 18. The output of AND gate 36 is connected to the input of each of AND gate 38, each of which couples a preceding binary stage in selection device 16 to a subsequent binary stage. That is, the output of stage 42 of selection device 16 is connected to the input of an AND gate 38 whose output in turn is connected to the input of binary device 46.

In the operation of the apparatus of FIG. 1, the search word data items are sequentially transferred from the storage means 20 into the search register 12 and then compared simultaneously with all of the data words stored in the memory matrix 10. On each word line associated with a matrix location storing a data word which mismatches the data word in the search register 12, a mismatch signal will be developed which will cause the corresponding selection device binary stage to assume a mismatch state. Prior to the subsequent search item data word being compared with the stored data words, the information stored in each of the binary stages of the selection device 16 is shifted to a subsequent binary stage. After each of the search item data words has been compared with all of the stored words, a selection device binary stage defining a match state indicates that the data word stored in the location associated with that binary stage forms part of a stored item all of whose data words match the search item data words.

Figure 2:
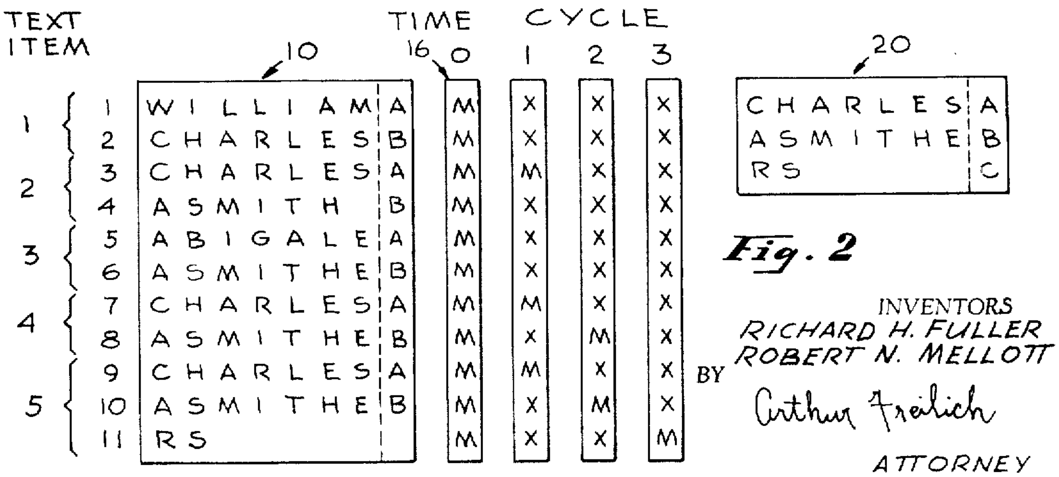
FIG. 2 is a diagram illustrating typical data adapted to be processed by the apparatus of FIG. 1.

In order to illustrate a typical example of the utility of the apparatus of FIG. 1, attention is called to FIG. 2 which illustrates a portion of a list of names stored in a portion of the memory matrix 10. Let it be assumed that each location in the memory matrix 10 can store alphanumeric characters. In accordance with most common alphanumeric coding, each character is represented by six binary digits and consequently the data word length of the memory matrix of FIG. 2 would be 48 bits. Inasmuch as each of the items can occupy one or more locations in the memory matrix 10, one character in each location will be dedicated to identifying the position of the associated word in its item. Thus, item 1 comprises the name WILLIAM CHARLES which item, it will be noted is stored in locations 1 and 2 of the memory matrix 10. It will further be noted that a position tag A forms part of the data word stored in location 1 and a position tag B forms part of the data word stored in location 2. Item 2 comprises the name CHARLES A. SMITH which is stored in locations 3 and 4 of the memory matrix 10. Again, the position tags A and B form part of the data words stored in locations 3 and 4. With respect to item 5, it will be noted that the name CHARLES A. SMITHERS requires three memory matrix locations, i.e. locations 9, 10, and 11 respectively storing data words including position tags A, B, and C.

Let it be assumed that it is desired to conduct an exact match search for the name CHARLES A. SMITHERS. In order to perform such a search, the name CHARLES A. SMITHERS is entered into the storage means 20 together with the appropriate position tags. At time 0 prior to actually initiating the performance of the search, all of the binary stages in the selection device 16 are set to a match state. Subsequently, the first data word in the search item stored in the storage means 20 is transferred to the search register 12 and an initial search cycle is performed with respect to the data word CHARLES A. As a result of this initial search cycle, only the binary stages in selection device 16 associated with memory matrix locations 3, 7, and 9 will subsequently remain in a match state. Prior to initiating the second search cycle, the state of each of the selection device binary stages are shifted to a subsequent binary stage. Thus, the match states of binary stages 3, 7, and 9 of the selection device 16 are respectively shifted into stages 4, 8, and 10 of the selection device. Concurrently with the selection device shifting, the second data word stored in the storage means 20 is transferred to the search register 12 and a second search cycle is performed. As a result of the second search cycle, the match state stored by stage 4 of the selection device is switched to a mismatch state inasmuch as the data word in memory matrix location 4 does not match the data word in the search register. However, the match states defined by stages 8 and 10 of the selection device are retained inasmuch as the data words contained in memory locations 8 and 10 match the second data word in the search item. The timing means 18 then provides an additional signal which again shifts the states of the selection device stages and causes the third data word in the search ite mto be entered into the search register 12. At the completion of the third search cycle, the counter 24 will define the number 3 which will be recognized by the compare means 32 as being equal to the number initially stored in register 22 when the search item was entered into the storage means 20. When the compare means 32 recognizes identity between the states of the counter 24 and register 22, the stages of the selection device 16 can be inspected to locate stages defining a match state. It will be noted that only stage 11 defines a match state and consequently it can be concluded that only the item containing the data word stored in memory matrix locations 11, matches the search item stored in the storage register 20.

In accordance with the previous discussions of content addressable memories and selection devices as for example are contained in the aforecited U.S. patent applications, the match state defined by stage 11 of the selection device can be utilized in several different manners in further processing. For example, it may be desired to merely read out the addresses of the physical locations storing the matching item or to cause information relating to the name CHARLES A. SMITHERS to be read out from some other storage means (not shown). In the event that a plurality of selection device stages define a match state at the completion of a search, each such match indication can be handled sequentially in the manner discussed in the aforecited U.S. patent application Serial No. 296,001.

From the foregoing, it should be appreciated that a content addressable memory apparatus has been disclosed herein which is exceedingly useful for processing free text or other relatively unformatted data. The principal features of the apparatus which facilitate such processing comprise both the incorporation of a shifting capability between the selection device stages and the utilization of position information in each item to identfy the position of data words in the item. It is pointed out that many other techniques can be used for performing the function served by the position tags illustrated. For example, if the restriction that searches will always be conducted starting with the first data word in the search item, can be tolerated, then it is only necessary to tag the first data word in each stored item rather than every data word. The first data word in each stored item can be tagged merely by dedicating only one bit in each data word for taging purposes and by e.g. writing a "1" into the dedicated tag bit in the first word of each item. Thus, the position information contained in each stored data word would indicate that the data word either was or was not the first word in a stored item. It should be apparent that this latter technique saves a considerable amount of memory space when compared with the space required for tagging in accordance with the technique of FIG. 2.

The embodiments of the invention in which an exclusive property or privilege is claimed are defined as follows:

1. In combination with a content addressable memory including means for simultaneously comparing a search data word with stored data words together with a selection device including N binary stages, each stage being responsive to a mismatch comparison between said search data word and a different one of said stored data words for switching from a first to a second information state;

means for periodically modifying said search data word and for shifting the information state stored in each of said binary stages to an immediately subsequent binary stage.

2. The combination of claim 1 wherein each of said stored data words forms part of a stored item comprised of an ordered series of at least one data word and includes information indicating its position in its item.

3. In combination with a content addressable memory of the type including a memory matrix having N data word locations, each location having a word line associated therewith, a selection device comprised of N stages, each stage including a binary device connected to a different one of said word lines, a search register for storing a data word, and means for simultaneously comparing the contents of said search register with the contents of each of said locations for developing a mismatch signal on those word lines associated with locations whose contents mismatch the contents of said register and wherein each of said binary devices switches from a first to a second state in response to the application of a mismatch signal thereto, apparatus for comparing a multiple data word search item with each of a plurality of multiple data word items stored in said memory matrix, said apparatus comprising:

means for sequentially entering each of said search item data words into said search register; and means for shitfing the information stored in each of of said binary devices to an immediately subsequent binary device each time a new data word is entered into said search register.

4. The combination of claim 3 wherein each of said items stored in said memory matrix includes an ordered series of at least one data word, each data word being stored in a different memory location and data words common to the same item being stored in adjacent locations and wherein each data word includes information indicating its position in its item.

5. Apparatus for comparing a multiple data word search item with a plurality of stored items, said apparatus comprising:

storage means storing said search item;

a content addressable memory including a matrix having N data word locations each having a different word line associated therewith;

timing means defining a plurality of successive periods;

means active in each of said periods for comparing a different search item data word with the data words stored in said N locations and for generating a mismatch signal on each of said word lines associated with a location storing a data word mismatching said compared search item data word;

N binary devices each connected to a different word line and each responsive to a mismatch signal applied thereto for switching from a match state to a mismatch state; and means interconnecting said binary devices for shifting the state of each binary device to a subsequent binary device during each of said periods.

6. Apparatus for comparing a multiple data word search item with a plurality of stored items, said apparatus comprising:

storage means storing said search item;

a content addressable memory including a matrix having N data word locations each having a different word line associated therewith;

timing means defining a plurality of successive periods;

means active in each of said periods for comparing a different search item data word with the data words stored in said N locations and for generating an indicating signal on each of said word lines indicating whether the data word stored in the location associated therewith matches or mismatches said compared search item data word;

N binary devices each connected to a different word line and each responsive to a mismatch signal applied thereto for switching from a match state to a mismatch state; and means interconnecting said binary devices for shifting the state of each binary device to a subsequent binary device during each of said periods.

7. A data processing system comprising:

a memory matrix including an ordered series of N data word locations;

said memory matrix storing a plurality of items, each item comprised of an ordered series of at least one data word, each data word being stored in a different memory location;

means storing a search item comprised of an ordered series of at least one data word;

N binary devices each associated with a different one of said locations;

timing means defining a plurality of successive periods;

means for simultaneously comparing a different search item data word in each of said periods with each stored data word and for generating a mismatch signal with respect to each location storing a data word mismatching said search item data word;

means responsive to said mismatch signals for switching each of said binary devices from a first to a second state; and means active during each of said periods for causing each of said binary devices preceded by a binary device defining a first state, to switch to a first state and each of said binary devices preceded by a binary device defining a second state, to switch to a second state.

8. The system of claim 7 wherein each of said data words includes information representing its position in its item.

References Cited by the Examiner

UNITED STATES PATENTS

| | | | |
|---|---|---|---|
| 3,195,109 | 7/1965 | Behnke ---------- | 340—172.5 |

OTHER REFERENCES

Kiseda: A Magnetic Associative Memory, IBM Journal, April 1961, pages 106–121.

Corneretto: Associative Memories, Electronic Design, Feb. 1, 1963, pages 40–55.

ROBERT C. BAILEY, *Primary Examiner.*

W. M. BECKER, P. J. HENON, *Assistant Examiners.*